United States Patent [19]

El-Hamamsy et al.

[11] Patent Number: 5,107,185
[45] Date of Patent: Apr. 21, 1992

[54] SHIELDED STARTING COIL FOR AN ELECTRODELESS HIGH INTENSITY DISCHARGE LAMP

[75] Inventors: Sayed-Amr A. El-Hamamsy; John W. Blackmore, both of Schenectady, N.Y.

[73] Assignee: General Electric Company, Schenectady, N.Y.

[21] Appl. No.: 719,450

[22] Filed: Jun. 24, 1990

[51] Int. Cl.⁵ .......................... H05B 41/16
[52] U.S. Cl. ................... 315/248; 315/344; 313/234
[58] Field of Search ............ 315/248, 344, 85, 39, 315/348, 267; 313/234, 607

[56] References Cited

U.S. PATENT DOCUMENTS

| | | | |
|---|---|---|---|
| 4,810,938 | 3/1989 | Johnson et al. | 315/2 |
| 4,812,702 | 3/1989 | Anderson | 313/153 |
| 4,894,589 | 1/1990 | Borowiec | 315/248 |
| 4,894,590 | 1/1990 | Witting | 315/248 |
| 4,902,937 | 2/1990 | Witting | 315/248 |
| 4,972,120 | 11/1990 | Witting | 313/638 |

Primary Examiner—Eugene R. LaRoche
Assistant Examiner—A. Zarabian
Attorney, Agent, or Firm—Jill M. Breedlove; James C. Davis, Jr.; Marvin Snyder

[57] ABSTRACT

A passive, resonant starting circuit for an electrodeless HID lamp includes a starting coil that is shielded from stray capacitances that would otherwise result in detuning the resonant circuit and hence decreasing efficiency. The starting circuit further includes a capacitance coupled in series with the starting coil and another capacitance coupled in parallel with the coil. In a preferred embodiment, the starting coil is enclosed in a conductive cylindrical housing which functions as both a shield from external capacitances and the resonant capacitance in parallel with the starting coil. The housing has a lengthwise gap in order to prevent the housing from acting as a short circuit secondary with respect to the starting coil. A conductive disk is mounted to the ground end of the housing to increase shielding even further. The parallel resonant capacitance is determined by the length of the housing and the distance between the coil and the housing.

8 Claims, 2 Drawing Sheets

SHIELDED STARTING COIL FOR AN ELECTRODELESS HIGH INTENSITY DISCHARGE LAMP

RELATED PATENT APPLICATION

This application is related to commonly assigned, copending U.S. patent application Ser. No. 07/719,855 (docket No. RD-20,854) of S. A. El-Hamamsy, J. P. Cocoma and G. A. Farrall, filed concurrently herewith and incorporated by reference herein.

FIELD OF THE INVENTION

The present invention relates to starting circuits for electrodeless high intensity discharge (HID) lamps and, more particularly, to such a starting circuit including a starting coil that is shielded from stray capacitances.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, for example, by first immersing the arc tube in liquid nitrogen so that the gas temperature is decreased to a very low value and then allowing the gas temperature to increase. As the temperature rises, an optimum gas density is eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current glow discharge therein. When the gas is sufficiently ionized, a transition is made from a relatively low current glow discharge to a relatively high current, high intensity solenoidal arc discharge. Such a starting aid may comprise, for example, a pair of capacitive starting electrodes, as described in U.S. Pat. No. 4,902,937 of H. L. Witting, issued Feb. 20, 1990, and assigned to the instant assignee, which patent is incorporated by reference herein. Each starting electrode comprises a conductive ring which surrounds the arc tube and is connected to the excitation coil of the HID lamp. Coupling a high voltage signal between the pair of starting electrodes causes an electric field to be produced therebetween which is of sufficient magnitude to create a glow discharge in the arc tube due to the arc tube wall capacitance. Furthermore, as it has been determined that the application of relatively large electric fields directly to the arc tube via the starting aid may cause early arc tube degradation, heat sensitive members, e.g. bimetallic strips, are utilized for moving the starting electrodes away from the arc tube after initiating an arc discharge, thereby preserving the useful life of the lamp.

Recently developed fixed starting aids for electrodeless HID lamps include means for removing the starting voltage from a fixed starting electrode after initiation of the arc discharge. For example, a gas probe starter includes a fixed starting electrode coupled to a starting chamber containing a gas, preferably at a low pressure relative to that of the arc tube fill, which chamber is attached to the outer surface of the arc tube. One such starting aid is the subject of commonly assigned Roberts et al. U.S. patent application, Ser. No. 622,247 (docket No. RD-19,981), filed Dec. 4, 1990, which is incorporated by reference herein. As described in the Roberts et al. application, a starting voltage is applied to the starting electrode by a starting circuit, causing the low-pressure gas in the starting chamber to become conductive. As a result, a sufficiently high voltage is applied to the arc tube to ionize the gaseous fill in the arc tube, thus forming an arc discharge therein. After the lamp has started, the starting voltage is removed from the starting electrode in order to extinguish the discharge current in the chamber which would otherwise have a detrimental effect on the arc tube wall.

A suitable starting circuit for applying a starting voltage to either a fixed or movable starting aid is described in commonly assigned, copending U.S. patent application Ser. No. 527,500 of S. A. El-Hamamsy and R. J. Thomas, filed May 23, 1990, which is incorporated by reference herein. The starting circuit of the El-Hamamsy and Thomas application comprises a high-efficiency power supply, including a tuned output circuit, for providing an RF signal to the starting electrode. Exemplary high-efficiency power supplies useful in the El-Hamamsy and Thomas starting circuit comprise Class-D and Class-E power amplifiers. The starting circuit operates at a higher frequency than that used to operate the lamp ballast which drives the excitation coil. In this way, the starting circuit is independent of the lamp ballast circuit and, therefore, does not interfere with the operation thereof.

Another suitable starting circuit is described in J. P. Cocoma and G. A. Farrall U.S. patent application No. 622,024 (docket No. RD-20,228), filed Dec. 4, 1990, which is assigned to the instant assignee and incorporated by reference herein. Cocoma and Farrall describe a passive starting circuit wherein a series resonant circuit is tuned to provide a starting voltage substantially simultaneously with the application of power to the excitation coil from the main power source.

One shortcoming of passive starting circuits is that stray capacitance effects can cause detuning, resulting in less than optimum performance. Furthermore, the reliance on stray capacitances to tune the circuit implies that even slight layout changes (e.g., the position of the coil in the circuit) cause significant detuning of the starting circuit. Therefore, it is desirable to avoid such stray capacitance effects and thus optimize starting circuit performance, i.e. enhance starting reliability.

OBJECTS OF THE INVENTION

Accordingly, an object of the present invention is to provide a new and improved starting circuit for an electrodeless HID lamp.

Another object of the present invention is to provide a starting circuit for an electrodeless HID lamp which includes shielding from stray capacitances in order to avoid detuning the starting circuit.

Another object of the present invention is to provide a starting coil for an electrodeless HID lamp having a capacitive shield.

Another object of the present invention is to provide a passive starting circuit including tuning capacitances which are controlled by suitable construction of the starting circuit.

SUMMARY OF THE INVENTION

The foregoing and other objects of the present invention are achieved in a passive, resonant starting circuit for an electrodeless HID lamp including a starting coil and shielding means for shielding the starting coil from stray capacitances which would otherwise result in detuning the resonant circuit and hence decrease starting reliability. The starting circuit further includes a capacitance coupled in series with the starting coil and another capacitance coupled in parallel with the coil. In a preferred embodiment, the starting coil is enclosed in a conductive housing which functions as both a shield and the resonant capacitance in parallel with the starting coil. Preferably, the housing is cylindrical and has a lengthwise gap so as to prevent the housing from functioning as a short circuit secondary winding with respect to the starting coil. A conductive disk is also preferably mounted to the lower voltage, or ground, end of the housing to increase shielding even further.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
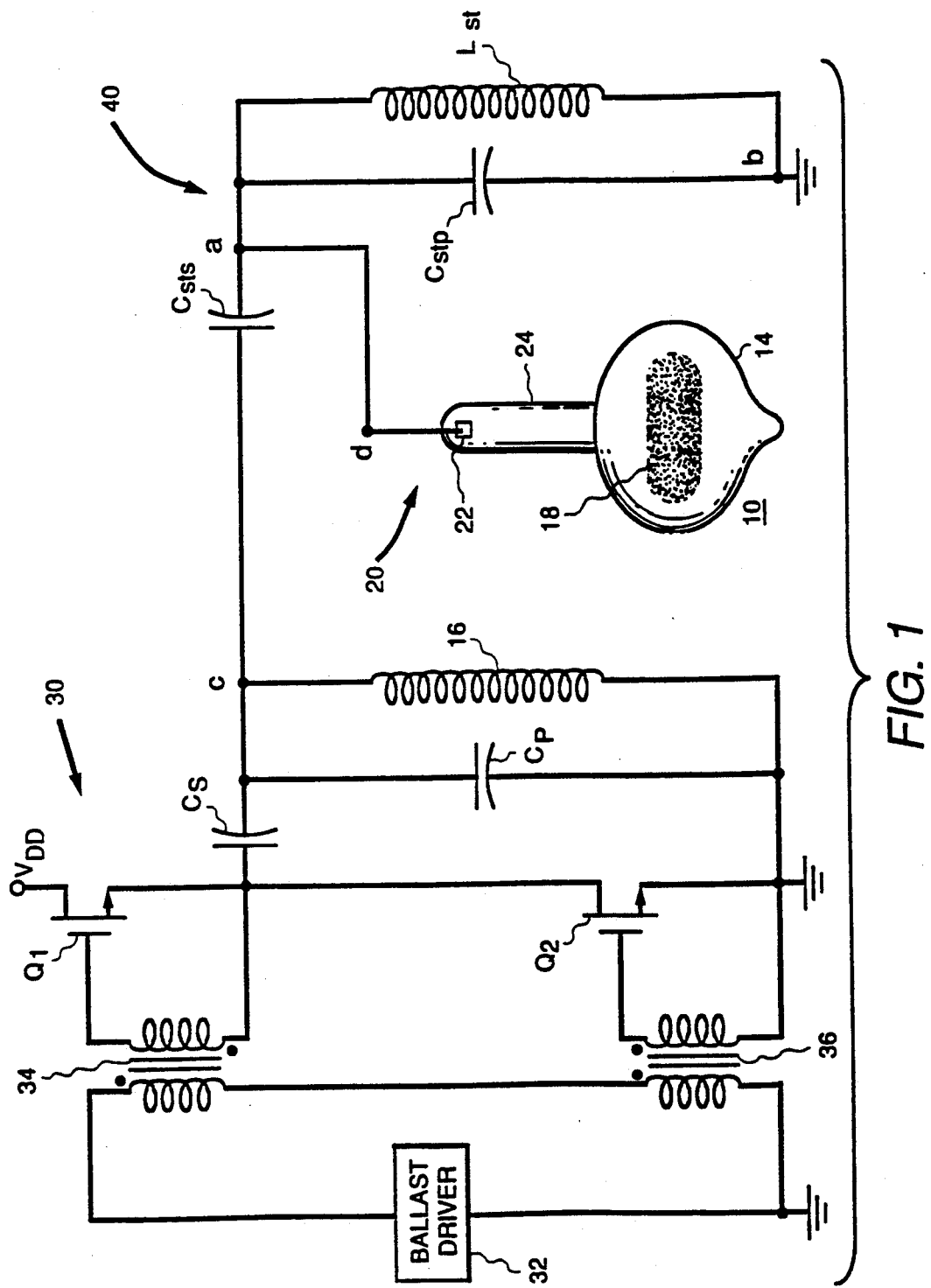
FIG. 1 is a schematic illustration of an electrodeless HID lamp system employing a starting circuit, including a shielded starting coil, according to the present invention.

FIG. 1 illustrates an electrodeless HID lamp system including an HID lamp 10, a starting probe 20, a radio frequency (RF) ballast 30, and a starting circuit 40. HID lamp 10 includes an arc tube 14 preferably formed of a high temperature glass, such as fused quartz, or an optically transparent or translucent ceramic, such as polycrystalline alumina. An excitation coil 16 surrounds arc tube 14 and is coupled to RF ballast 30 for exciting a toroidal arc discharge 18 therein. (For clarity of illustration, coil 16 is not shown in its operational position about arc tube 14.) By way of example, arc tube 14 is shown as having a substantially ellipsoid shape. However, arc tubes of other shapes may be desirable, depending upon the application. For example, arc tube 14 may be spherical or may have the shape of a short cylinder, or "pillbox", having rounded edges, if desired.

Arc tube 14 contains a fill in which an arc discharge 18 having a substantially toroidal shape is excited during lamp operation. A suitable fill is described in U.S. Pat. No. 4,810,938 of P. D. Johnson, J. T. Dakin and J. M. Anderson, issued on Mar. 7, 1989, and assigned to the instant assignee, which patent is incorporated by reference herein. The fill of the Johnson et al. patent comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. Another suitable fill is described in commonly assigned U.S. Pat. No. 4,972,120 of H. L. Witting, issued Nov. 20, 1990, which patent is incorporated by reference herein. The fill of the Witting patent comprises a combination of a lanthanum halide, a sodium halide, a cerium halide and xenon or krypton as a buffer gas. For example, a fill according to the Witting patent may comprise a combination of lanthanum iodide, sodium iodide, cerium iodide, and 250 torr partial pressure of xenon.

RF power is applied to the HID lamp by RF ballast 30 via excitation coil 16 coupled thereto. A suitable excitation coil 16 may comprise a two-turn coil having a configuration such as that described in commonly assigned, U.S. patent application Ser. No. 493,266 of G. A. Farrall, filed Mar. 14, 1990, now allowed, which patent application is incorporated by reference herein. Such a coil configuration results in very high efficiency and causes only minimal light blockage from the lamp. The overall shape of the excitation coil of the Farrall application is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself. Current flows through the fill within arc tube 14 as a result of this solenoidal electric field, producing toroidal arc discharge 18 therein. Suitable operating frequencies for RF ballast 30 are in the range from 0.1 to 300 megahertz (MHz), exemplary operating frequencies being 6.78 MHz and 13.56 MHz.

By way of example, ballast 30 is illustrated as comprising a Class-D power amplifier, such as the ballast described in commonly assigned, copending U.S. patent application Ser. No. 472,144 of S. A. El-Hamamsy and J. C. Borowiec, filed Jan. 30, 1990, which is incorporated by reference herein. The Class-D ballast includes two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 32 via input isolation transformers 34 and 36, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 32 may comprise means for generating two out-of-phase sinusoidal signals, as described in U.S. patent application Ser. No. 454,614, of S. A. El-Hamamsy and G. Jernakoff, filed Dec. 21, 1989, now allowed, which patent application is incorporated by reference herein.

A resonant load network is connected to the half-bridge at the junction between switching devices $Q_1$ and $Q_2$ and in parallel with switching device $Q_2$. The resonant load network comprises the excitation coil 16 of HID lamp 10 and a tuning capacitor $C_p$ connected in parallel therewith. The parallel combination of capacitor $C_p$ and coil 16 functions as an impedance transformer to reflect the impedance of the arc discharge 20 into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning. As described in the El-Hamamsy and Borowiec patent application, cited hereinabove, capacitors $C_s$ and $C_p$ are chosen to ensure impedance matching for maximum efficiency.

By way of example, starting probe 20 is illustrated in FIG. 1 as comprising a gas probe starter, such as that described in commonly assigned, copending Roberts et al. U.S. patent application No. 622,247, cited hereinabove. As described by Roberts et al., gas probe starter 20 comprises a starting electrode 22 coupled to a starting chamber 24 which is attached to the outer wall of arc tube 14 and contains a gas. The gas in starting chamber 24 may comprise, for example, a rare gas at a pressure in the range from approximately 0.5 to 500 torr, with a preferred range being from approximately 5 to 40 torr. Preferably, the gas in chamber 24 is at a low pressure relative to that of the arc tube fill in order to promote even easier starting. In an exemplary HID lamp system, a suitable arc tube fill pressure may be approximately 200 torr while that of the gas in starting chamber 24 may be approximately 20 torr. It is to be understood, however, that the starting circuit of the present invention may be used with other suitable types of starting probes, such as a fixed foil electrode of the type described in commonly assigned, copending El-Hamamsy and Thomas U.S. patent application, Ser. No. 527,500, cited hereinabove. Still other suitable starting electrodes may be movable, if desired, such as those described in: U.S. Pat. Nos. 4,902,937 and 4,894,590; of Witting and 4,894,589, of Borowiec, all of which are incorporated by reference herein.

Figure 2:
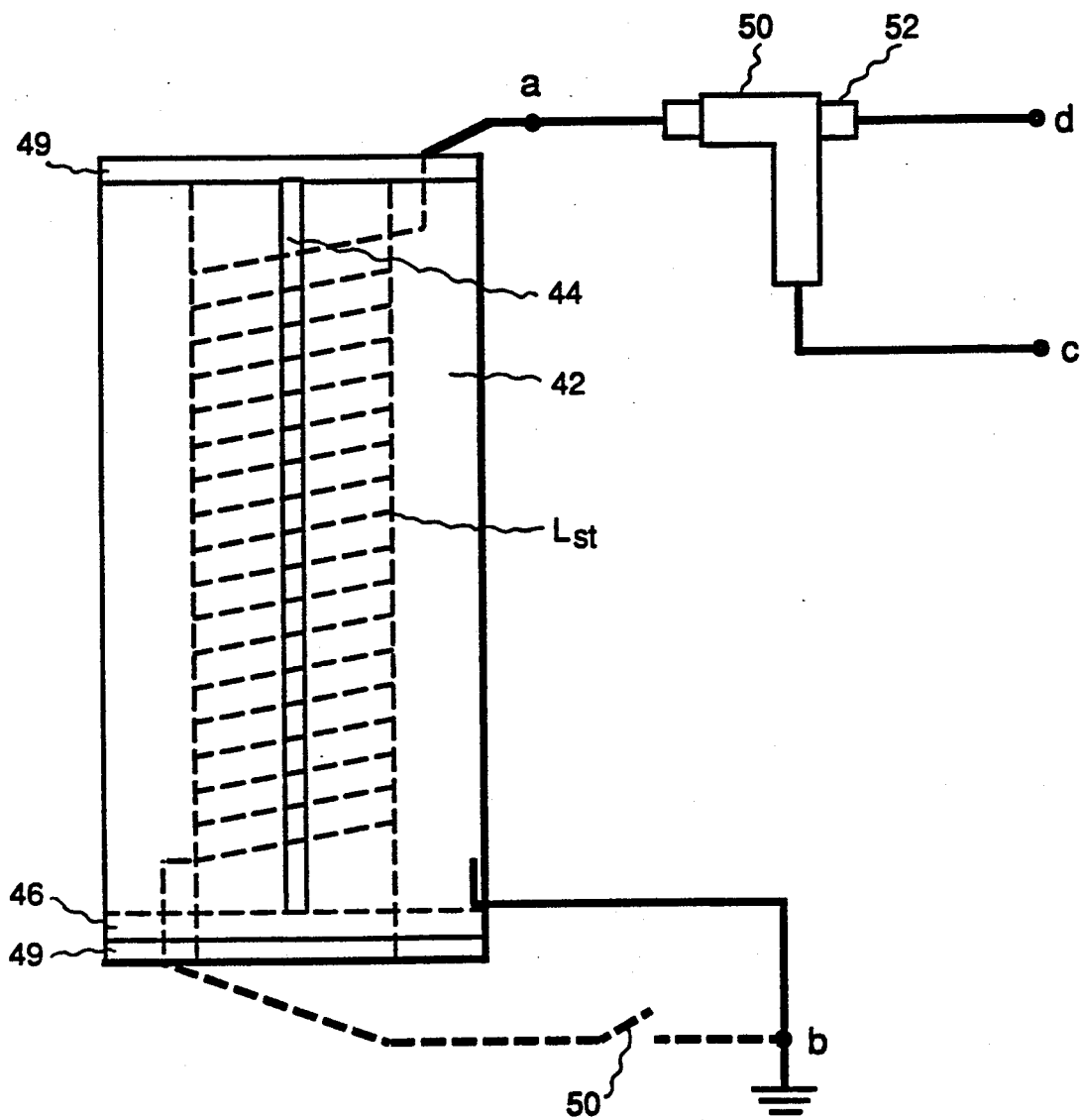
FIG. 2 is a front view of a shielded starting coil in a starting circuit according to a preferred embodiment of the present invention.

As shown in FIG. 1, starting circuit 40 comprises a passive resonant LC circuit including starting coil $L_{st}$, having a high voltage terminal a and a low voltage terminal b, a capacitance $C_{stp}$ coupled in parallel with starting coil $L_{st}$, and a capacitance $C_{sts}$ coupled in series with starting coil $L_{st}$. In accordance with the present invention, the starting coil $L_{st}$ includes shielding means for shielding the coil from external capacitances which could otherwise cause starting circuit 40 to become detuned, thereby reducing circuit efficiency. In a preferred embodiment, as shown in FIG. 2, the starting coil is enclosed in a preferably cylindrical housing 42 comprised of a suitable conductor, e.g. copper or aluminum. The cylindrical housing has a lengthwise gap 44 formed therein in order to prevent the housing from acting as a short circuit secondary winding with respect to starting coil $L_{st}$.

Advantageously, the capacitance between the housing, or shield, 42 and the coil $L_{st}$ comprises the parallel starting capacitance $C_{stp}$ of starting circuit 40. In particular, the capacitance $C_{stp}$ is determined by the length of the cylindrical housing 42 and the distance between coil $L_{st}$ and shield 42. The distance between the coil and the shield must be sufficiently large so that the air within the housing (i.e., between the high voltage terminal a of starting coil $L_{st}$ and housing 42) does not break down when the high RF voltage needed to initiate the discharge in the arc tube is applied by the lamp ballast.

As shown in FIG. 2, a preferred embodiment of the shielding means further includes a conductive disk 46, preferably made of the same conductive material as housing 42, soldered on the ground side of cylindrical housing 42 for increasing the shielding capability of the starting coil. A conductive disk is not mounted on the higher voltage side of the starting coil (at terminal a) in order to further ensure against the break down of air within the housing between the high voltage terminal a of the starting coil and the shield. A high-voltage insulating disk 49 is preferably mounted on either end of housing 42. Such a high-voltage insulating disk may be comprised of, for example, synthetic resin polymers such as those sold under the trademark Teflon.

In a preferred construction of starting circuit 40, series capacitor $C_{sts}$ comprises a coaxial capacitor. As shown in FIG. 2, the coaxial series capacitor $C_{sts}$ is formed between the high voltage terminal a of starting coil $L_{st}$ and an external, cylindrical, conductive band 50 mounted on an insulating sleeve 52. The inside diameter of the insulating sleeve is preferably smaller (e.g., on the order of 1-2 mils smaller) than the outside diameter of the high voltage lead from the starting coil $L_{st}$. During assembly, the high voltage lead from the starting coil $L_{st}$ is coated with a dielectric grease, such as, for example, that sold under the trademark General Electric Silicone Dielectric Grease. The high voltage lead is then forced through insulating sleeve 52. In this way, air is prevented from being trapped between the high voltage lead and the insulating sleeve, thus avoiding dielectric breakdown therebetween. Finally, an insulating layer is disposed over conductive band 50. The capacitance of coaxial series capacitor $C_{sts}$ is thus controlled by the width of conductive band 50, the dielectric constant of insulating sleeve 52, and the thickness of insulating sleeve 52. As shown, conductive band 50 is connected to the high voltage side of the excitation coil at point c in the circuit of FIG. 1; and the high voltage lead from coil $L_{st}$, through insulating sleeve 52, is connected to the gas probe starter at point d in the circuit of FIG. 1.

In operation, upon application of an RF signal to excitation coil 16, starting circuit 40 resonates to a sufficiently high voltage to cause the gas in chamber 24 to break down, or ionize, and thus become conductive. As a result, a relatively low discharge current flows between electrode 22 and the arc tube wall. The discharge in the starting chamber may be characterized as either a glow discharge or an arc discharge, depending upon the pressure of the gas in chamber 24. At the low-end of the aforementioned gas pressure range, the discharge is more likely to be characterized as a glow, while at the high-end of the gas pressure range, the discharge is more likely to be characterized as an arc. However, there is no generally accepted definition which distinguishes between glow and arc discharges. For example, as described by John H. Ingold in "Glow Discharges at DC and Low Frequencies" from Gaseous Electronics, vol. I, edited by M. N. Hirsh and H. J. Oskam, Academic Press, New York, 1978, pp. 19-20, one definition is based on electrode-related phenomena, and another is based on electron and particle temperatures. In any event, as a result of the discharge current in starting chamber 24, a sufficiently high starting voltage is capacitively coupled to the inside surface of arc tube 14 which causes the high-pressure gaseous fill contained therein to break down, thereby initiating arc discharge 18.

In an alternative embodiment of starting circuit 40, as shown in phantom in FIG. 2A, a glow suppression relay 50 is employed in series with the starting coil $L_{st}$. Such a glow suppression relay is described in Cocoma and Farrall U.S. patent application No. 622,024, cited hereinabove. The glow suppression relay is employed to detune the resonant starting circuit after initiation of the discharge so that the starting voltage is decreased sufficiently to extinguish the glow discharge in the starting chamber. During lamp start-up, relay 50 is closed. However, after initiation of the arc discharge in the arc tube, relay 50 is opened, thus effectively removing starting coil $L_{st}$ from starting circuit 40. The starting circuit is thus detuned, and the glow discharge is extinguished. As a result, the flow of leakage currents between the starting chamber 24 (FIG. 1) and the arc tube, which would otherwise eventually have a detrimental effect on the arc tube wall, is avoided.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting circuit for an electrodeless high intensity discharge lamp of the type having an excitation coil situated about an arc tube and coupled to a radio frequency power supply for exciting an arc discharge in an ionizable fill contained in said arc tube, comprising:
   a starting probe disposed proximate to said arc tube;
   resonant circuit means for receiving a radio frequency signal from said radio frequency power supply and providing a resonant starting voltage to said starting probe of sufficient magnitude to initiate the arc discharge in said arc tube, said resonant circuit means including a starting coil coupled in series with a first resonant capacitance and coupled in parallel with a second resonant capacitance; and
   shielding means for shielding said starting coil from additional external capacitances.

2. The starting circuit of claim 1 wherein said shielding means comprises a conductive housing substantially enclosing said starting coil, and said second resonant capacitance comprises the capacitance between said starting coil and said housing.

3. The starting circuit of claim 2 wherein said conductive housing is substantially cylindrical and has a gap formed along the length thereof.

4. The starting circuit of claim 3 wherein said conductive housing further includes a conductive disk mounted at the higher voltage end thereof.

5. The starting circuit of claim 1 wherein:
   said starting coil includes a high voltage lead and a low voltage lead extending from respective high and low voltage terminals thereof, said high voltage lead being coupled to said starting probe; and
   said first resonant capacitance comprises a coaxial capacitor including a conductive band disposed about an insulating sleeve, said insulating sleeve encasing a predetermined portion of the high voltage lead from said starting coil so that there is negligible air gap therebetween, said conductive band being coupled to the excitation coil of the lamp.

6. The starting circuit of claim 1 wherein said starting probe comprises a gas probe starter including:
   a starting chamber having a wall enclosing an interior containing a gas, said chamber being attached to the outer wall of said arc tube; and
   a starting electrode for coupling said starting voltage to the interior of said starting chamber so as to initiate a glow discharge in said starting chamber which is capacitively coupled to the fill in said arc tube.

7. The starting circuit of claim 6, further comprising detuning means coupled to said resonant circuit means for detuning said starting circuit after initiation of the arc discharge.

8. The starting circuit of claim 7 wherein said detuning means comprises a detuning relay coupled in said resonant circuit so as to be opened after initiation of the arc discharge in order to detune said starting circuit, thereby substantially reducing said starting voltage.

* * * * *

UNITED STATES PATENT AND TRADEMARK OFFICE
CERTIFICATE OF CORRECTION

PATENT NO. : 5,107,185

DATED : April 21, 1992

INVENTOR(S) : Sayed-Amr A. El-Hamamsy and John W. Blackmore

It is certified that error appears in the above-identified patent and that said Letters Patent is hereby corrected as shown below:

On the title page, after "[22] Filed: Jun. 24,", delete "1990" and substitute -- 1991 -- therefor.

Signed and Sealed this

Twenty-ninth Day of June, 1993

Attest:

MICHAEL K. KIRK

*Attesting Officer*  *Acting Commissioner of Patents and Trademarks*